United States Patent [19]

Garin, III

[11] Patent Number: 5,435,404
[45] Date of Patent: Jul. 25, 1995

[54] POWERED MOBILITY CHAIR FOR INDIVIDUAL

[76] Inventor: Paul V. Garin, III, 11069 E. Wrenwood, Clovis, Calif. 93612

[21] Appl. No.: 284,726

[22] Filed: Aug. 2, 1994

Related U.S. Application Data

[63] Continuation of Ser. No. 923,732, Jul. 31, 1992, abandoned.

[51] Int. Cl.$^6$ ............................................. B62D 11/04
[52] U.S. Cl. .................................. 180/6.5; 180/65.1; 180/907
[58] Field of Search ............... 180/65.1, 65.5, 907, 180/23, 12, 13, 6.48, 6.5, 6.2

[56] References Cited

U.S. PATENT DOCUMENTS

| | | | |
|---|---|---|---|
| 2,986,200 | 5/1961 | Nobile | 155/30 |
| 3,104,112 | 9/1963 | Crail | 280/5.2 |
| 3,191,990 | 6/1965 | Rugg et al. | 297/83 |
| 3,580,591 | 5/1971 | Coffey et al. | 280/5.32 |
| 3,901,527 | 8/1975 | Danziger et al. | 280/211 |
| 3,952,822 | 4/1976 | Udden et al. | 180/6.5 |
| 3,953,054 | 4/1976 | Udden et al. | 297/347 |
| 4,108,449 | 8/1978 | Rhodes | 280/5.28 |
| 4,513,832 | 4/1985 | Engman | 180/907 |
| 5,183,133 | 2/1993 | Roy et al. | 180/907 |

FOREIGN PATENT DOCUMENTS

| | | | |
|---|---|---|---|
| 48304 | 4/1983 | Japan | 180/907 |

OTHER PUBLICATIONS

"All-Terrain Wheelchair, Designer's Corner", *Design News*, (Feb. 24, 1992), p. 54.

Primary Examiner—Richard M. Camby
Attorney, Agent, or Firm—Townsend and Townsend Khourie and Crew

[57] ABSTRACT

The power chair of the present invention is a vehicle which is highly maneuverable and has a high degree of usable power. It provides maximum weight distribution to the pair of driving wheels of the vehicle unit. It greatly enhances the stability and provides an overall operating envelope of greatly reduced size, allowing the use of the vehicle in confined areas. The vehicle has a pair of drive wheels rotatably about a common axis which is transverse to the forward direction of the travel of the vehicle, the drive wheels being powered by respective drive motors. The center of mass of the vehicle and passenger is substantially in the vertical plane of the axis of the drive wheels. This arrangement increases the amount of weight for traction. The alignment of the mass with the axis of the driving wheels maximizes the resistance of the vehicle to steering deviations caused by centrifugal force. Stability fore and aft is provided by castering wheels placed in front of and behind the driving wheels. The rear wheel caster is preferably attached to a vertical pivoting swing arm. The movement of this arm is controlled by a spring and shock absorber assembly. However, the rear caster may be mounted with a rigid arm. Generally, at least one of the supporting arms must be spring biased to insure that substantially all wheels of vehicle remain on the ground, and also for shock absorbing purposes.

20 Claims, 8 Drawing Sheets

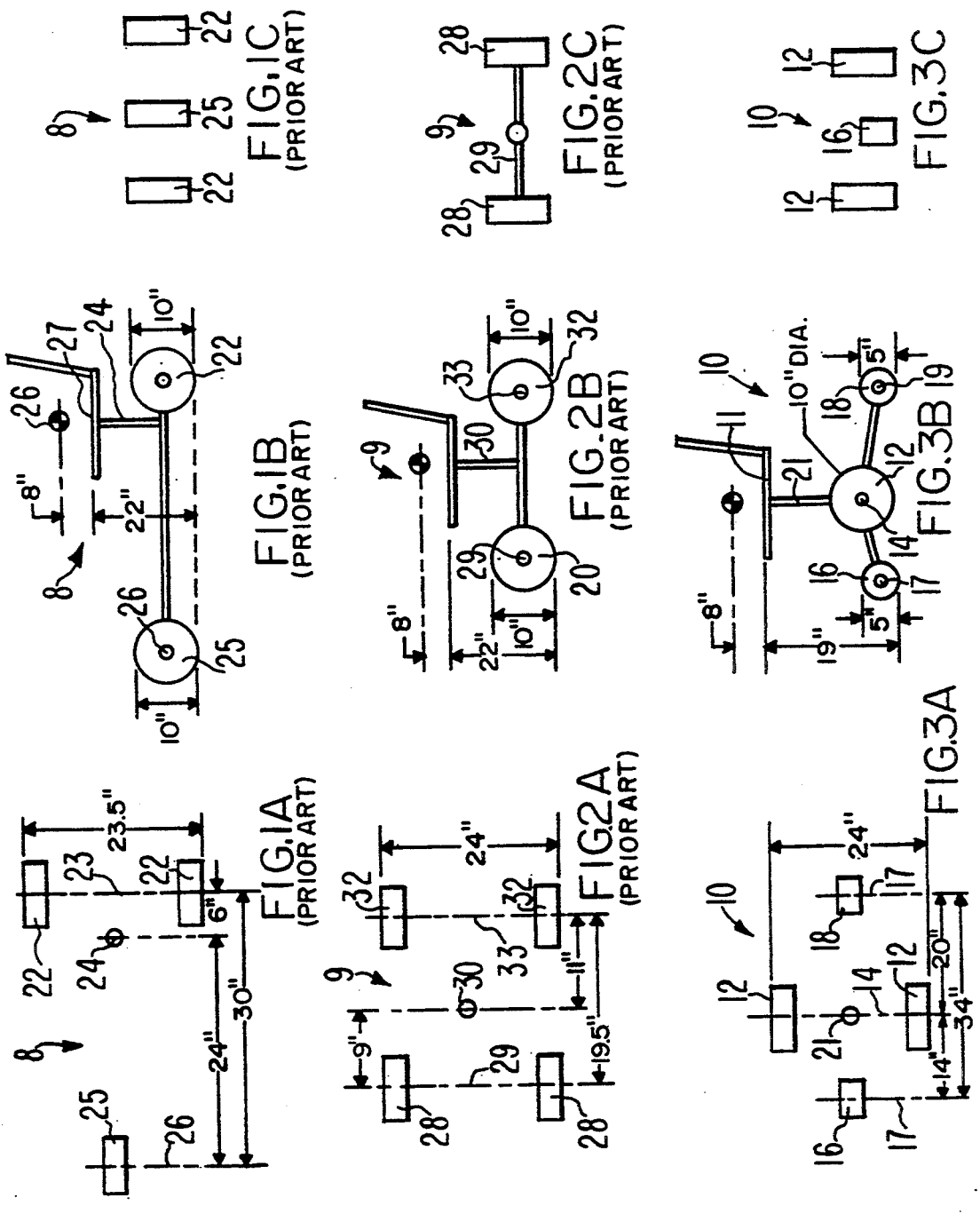

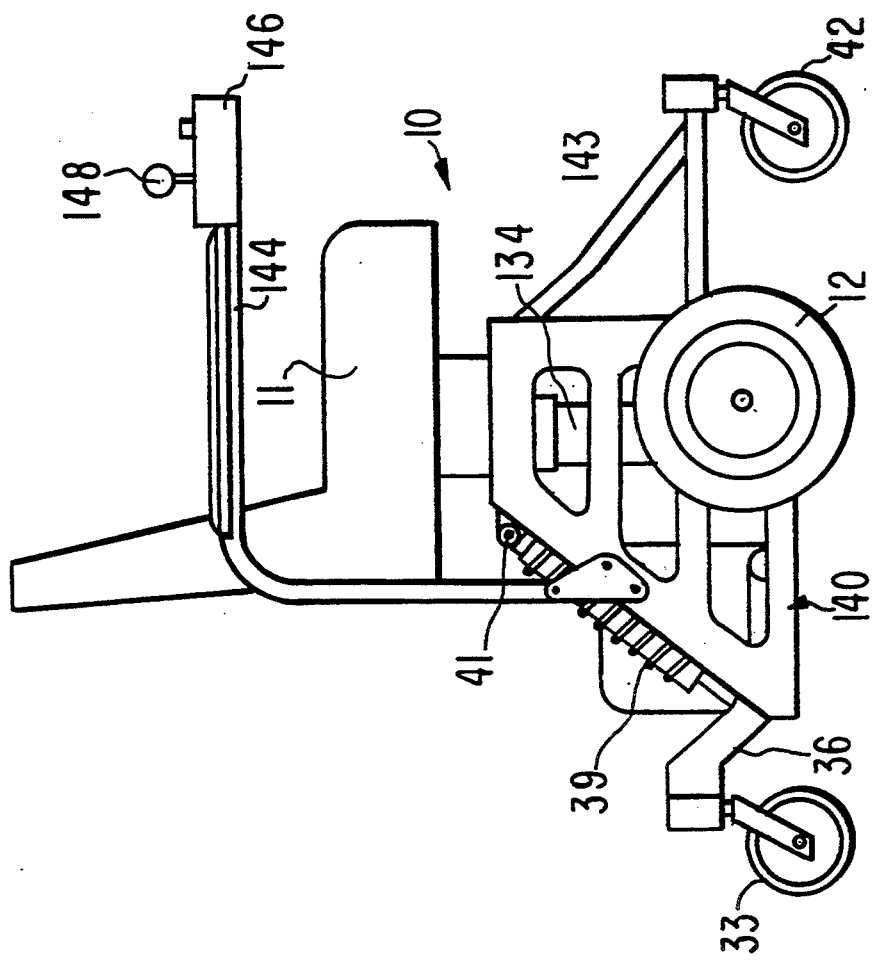
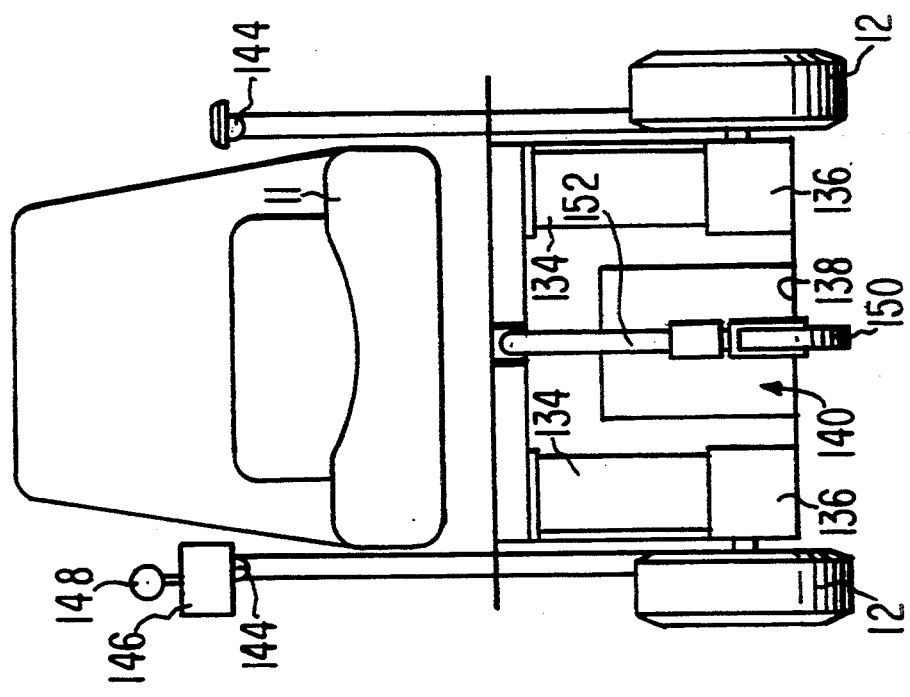

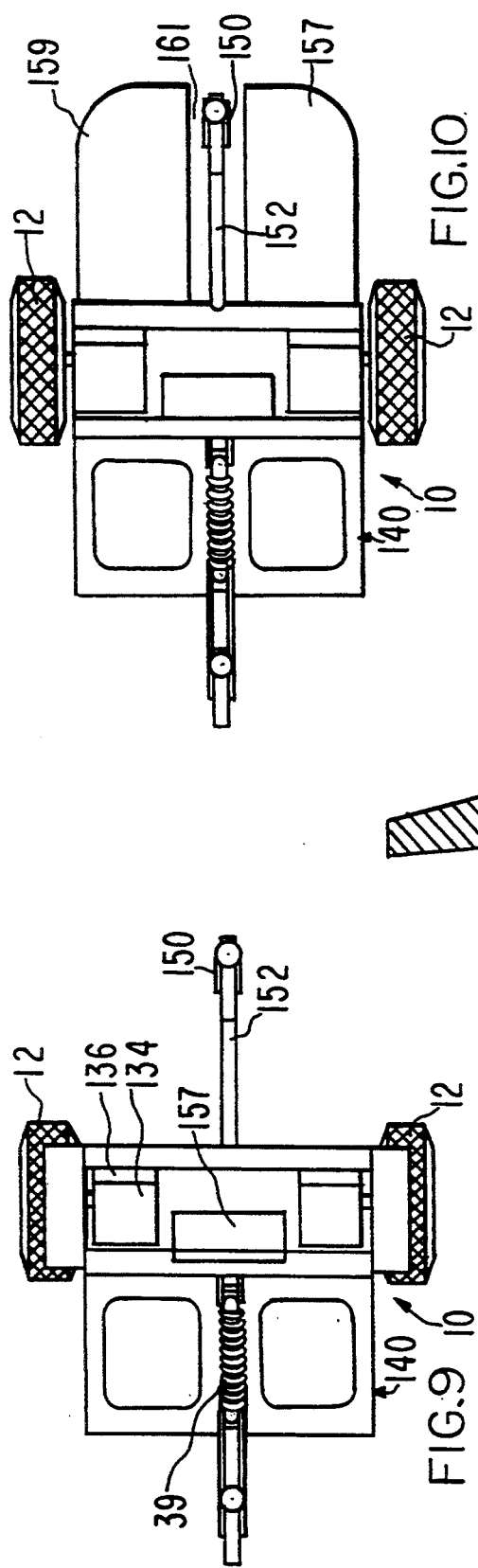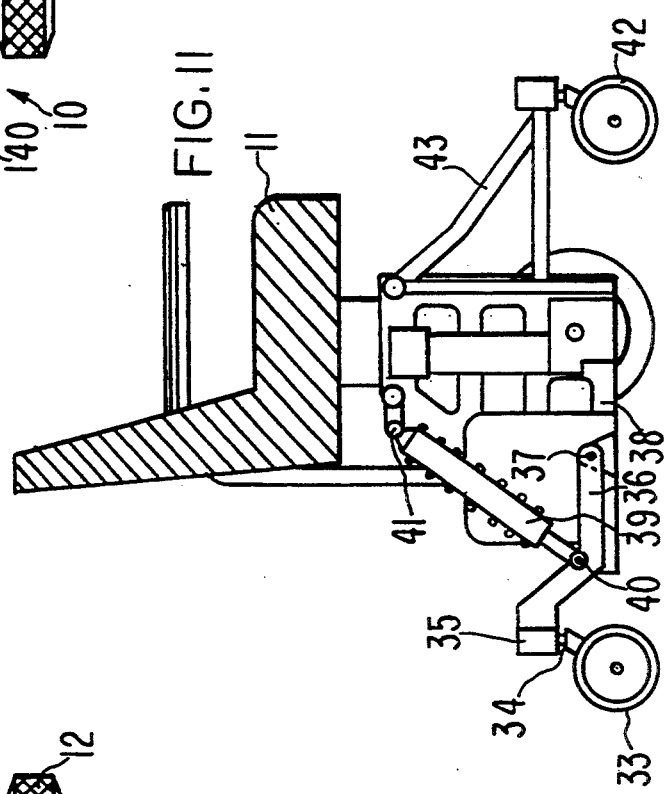

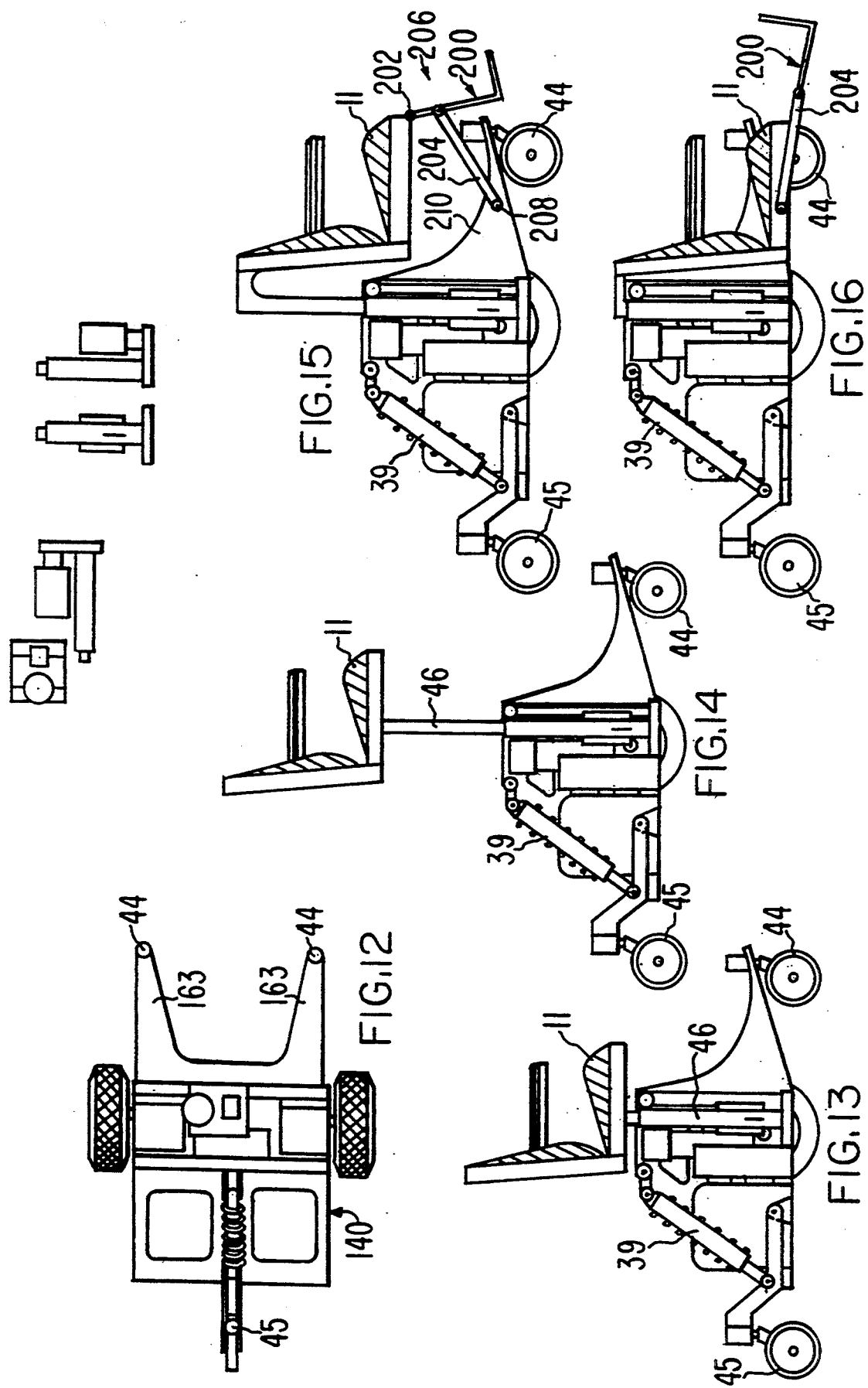

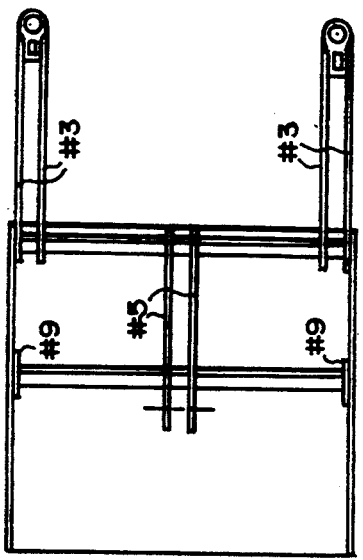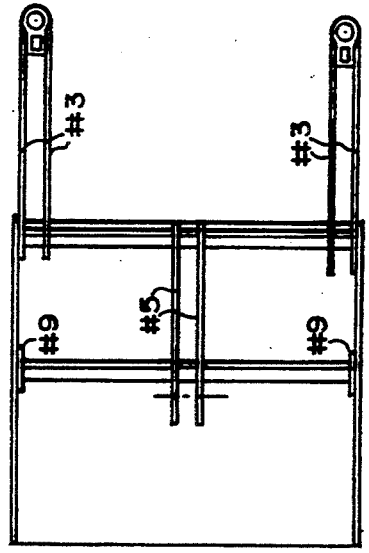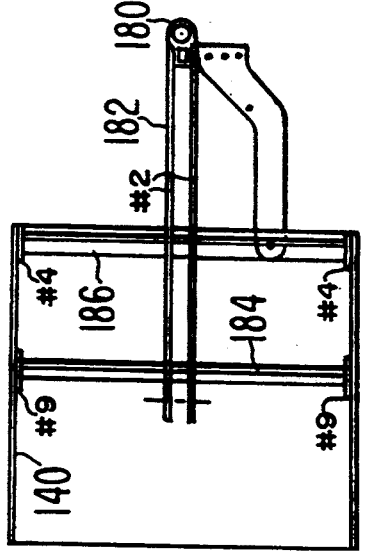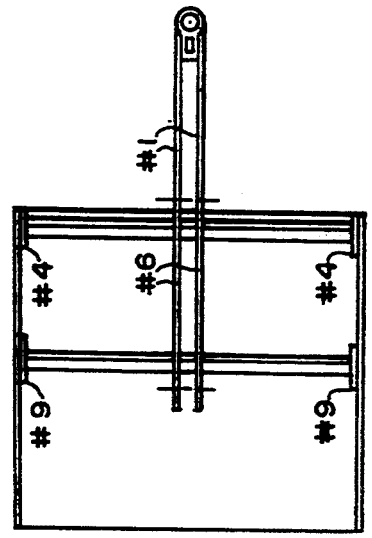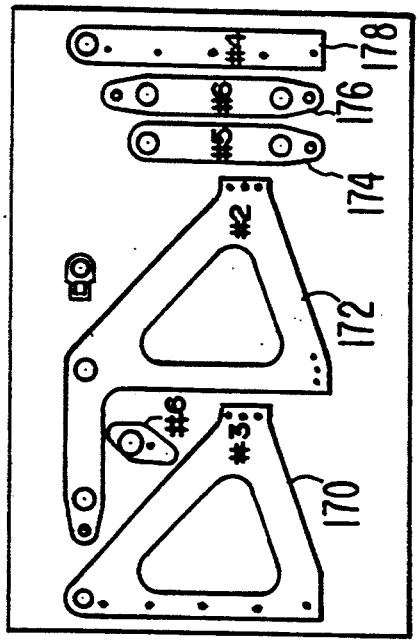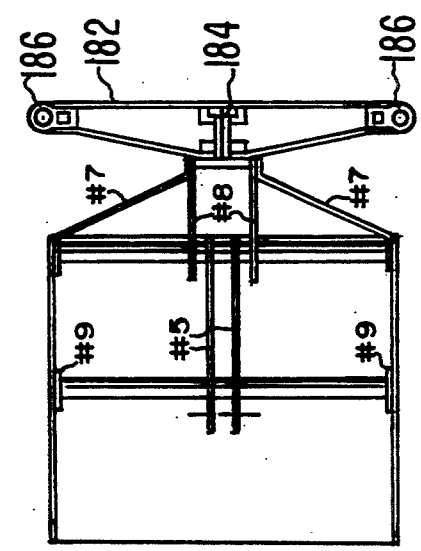

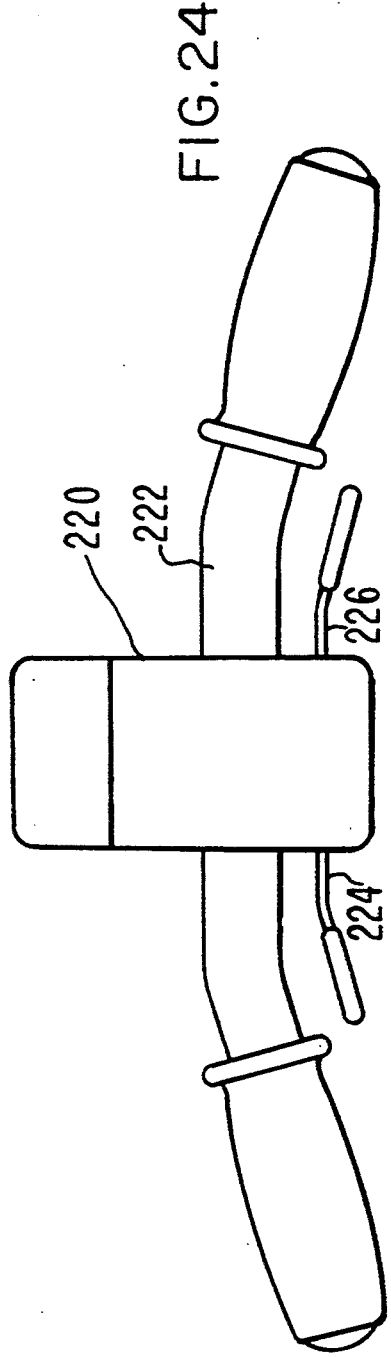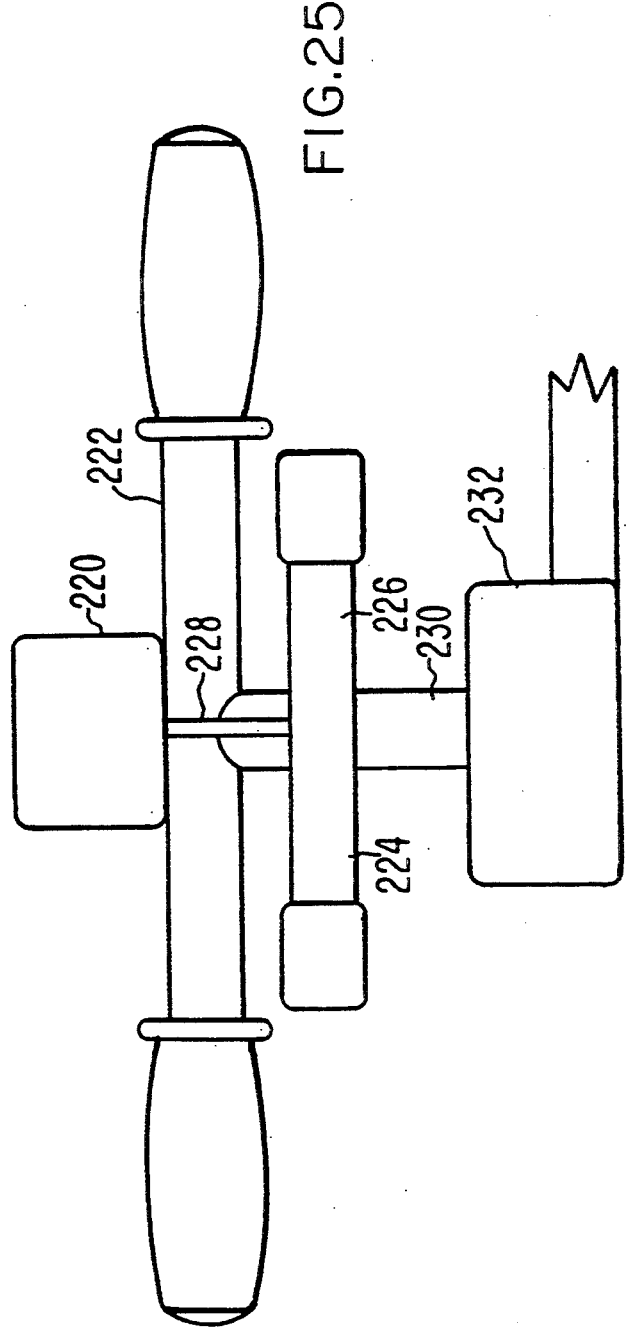

POWERED MOBILITY CHAIR FOR INDIVIDUAL

This is a Continuation of application, Ser. No. 07/923,732, filed Jul. 31, 1992, now abandoned.

This invention relates to power vehicles which move over the ground and carry an individual and, more particularly, to such a power vehicles which provides improved stability and other advantages over conventional mobility vehicles for individuals.

BACKGROUND OF THE INVENTION

The majority of powered mobility vehicles for individuals who are physically handicapped are generally categorized into two principal groups, namely motor scooters and power chairs. A scooter typically has three wheels although four wheel versions have been known to exist. A pair of rear wheels are powered by a single electric motor and the passenger is seated forwardly of the rear axle.

In a power chair version of a conventional mobility device, the chair has four wheels, the front wheels generally not being powered but the rear wheels being driven by independent electric motors powered by batteries. The passenger is seated ahead of the rear wheels.

A number of deficiencies have been noted in conventional mobility devices of the scooter and chair types. Because the passenger is typically carried well forward of the driving, rear wheels, a major portion of the total vehicle weight is supported by the front wheels. This has several undesirable effects for such mobility devices.

In a three-wheeled scooter, the scooter body is very prone to tipping during the most moderate of turns of the vehicle. In the case of a four-wheeled power chair, the high weight loading, which exceeds 50% under some circumstances, makes the swiveling action of the front casters extremely difficult to achieve, particularly on surfaces such as gravel or deep carpet. In such cases, a large amount of power is needed to effect a turn of the device. When turning or steering the front wheels, the high power levels delivered to the drive wheels causes an abrupt and, at worst, uncontrollable surge and swerve in the direction of the turn when the initial resistance is overcome.

Due to these same weight distribution problems, a four-wheeled chair has difficulty following a straight track while moving along the side of a hill. The weight of the passenger between the front steering wheels and the rear driving and steering wheels, produces a moment which causes the chair to turn down-slope unless immediate and significant uphill steering power is applied.

As power chairs have become more common and the public acceptance of the mobility impaired in everyday endeavors has become a fact, the chair user has expected greater and greater achievements from such devices. Units of far greater power and range are now the norm. Because of the high power and torque available from conventional DC motors, adhesion and traction problems have become significant. Small footprint tires and poor weight distribution, as described, cause excessive tire slippage and spinning. This in turn produces limited traction under adverse weather or terrain conditions and provides greater diminished steering response.

To counteract any tendencies to tip forwardly or backwardly during acceleration or deceleration, the wheel base must be relatively long with the seat placed somewhere between the front and rear wheels. This placement causes a constant compromise between anti-tip stability and realistic wheel loading. Moreover, these compromises require the layout of these conventional vehicles in less than an optimum manner.

Finally, the geometry, drive characteristics and overall packaging of the scooter or power chair produce large turning radii. They also result in clumsy handling of the scooter or power chair in confined spaces.

Because of the problems and drawbacks of conventional scooter and power chair versions of mobility devices, a need exists for an improved vehicle which avoids these problems and drawbacks to provide high usable power, maximum weight distribution to the drive wheels and enhanced stability and more intuitive control of the chair. This provides for pivoting of the chair, i.e., rotation of the chair without translation, and rotation of the chair, i.e., pivotal and translational movements. The present invention satisfies this need.

SUMMARY OF THE INVENTION

The power chair of the present invention is a vehicle which is highly maneuverable and has a high degree of usable power. It provides maximum weight distribution to the pair of driving wheels of the vehicle unit. It greatly enhances the stability and provides an overall operating envelope of greatly reduced size, allowing the use of the vehicle in confined areas.

The vehicle has a pair of drive wheels rotatably about a common axis which is transverse to the forward direction of the travel of the vehicle, the drive wheels being powered by respective drive motors. The center of mass of the vehicle and passenger is substantially in the vertical plane of the axis of the drive wheels. This arrangement increases the amount of weight for traction. The alignment of the mass with the axis of the driving wheels maximizes the resistance of the vehicle to steering deviations caused by centrifugal force.

Stability fore and aft is provided by castering wheels placed in front of and behind the driving wheels. The rear wheel caster is preferably attached to a vertical pivoting swing arm. The movement of this arm is controlled by a spring and shock absorber assembly. However, the rear caster may be mounted with a rigid arm. Generally, at least one of the supporting arms must be spring biased to insure that substantially all wheels of vehicle remain on the ground, and also for shock absorbing purposes.

Other objects of the present invention will become apparent as the following specification progresses, reference being had to the accompanying drawings for illustrations of several embodiments of the invention.

BRIEF DESCRIPTION OF THE DRAWINGS

FIGS. 1A, 1B and 1C are schematic views of a prior art three-wheeled scooter;

FIGS. 2A, 2B and 2C are schematics views of a four-wheel power chair or base of the prior art;

FIGS. 3A, 3B and 3C are schematic views similar to FIGS. 1A, 1B and 1C, but relate to the wheeled vehicle of the present invention;

FIG. 7 is a front elevational view of the wheeled vehicle of the present invention;

FIG. 8 is an elevational view of one side of the vehicle of the present invention;

FIG. 9 is a top plan view of the wheeled vehicle of FIG. 8 without foot treadles;

FIG. 10 is a top plan view of the wheeled vehicle of FIG. 8 with foot treadles;

FIG. 11 is a view similar to FIG. 8 but showing the interior portion of the vehicle, specifically in region of the drive motors and the shock absorber at the rear of the vehicle;

FIGS. 12–16 are various views of the pediatric version of the wheeled vehicle of the present invention;

FIGS. 18–23 are schematic top plan views of the frame and front caster mounts of the vehicle of the present invention; and FIGS. 24 and 25 are top plan and rear elevational views of an alternative control for steering and operating the vehicle of the present invention.

DETAILED DESCRIPTION OF THE PREFERRED EMBODIMENT

Figure 4A:
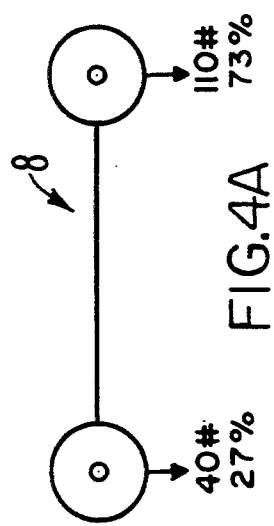
FIGS. 4A and 4B are schematic side elevational views of the scooter of FIGS. 1A, 1B and 1C, showing typical loadings for the scooter when empty and with a vehicle operator.
Figure 5A:
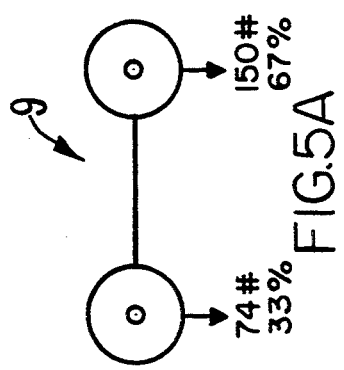
FIGS. 5A and 5B are views similar to FIGS. 4A and 4B but relate to the four wheel power base of the prior art.

FIGS. 3A, 3B and 3C show the power chair or vehicle 10 of the present invention, power chair 10 being a wheeled vehicle for carrying a single passenger on a seat or chair 11. Vehicle 10 has a frame and two drive wheels 12 on a pair of separate, axially aligned shaft segments. Also, a front caster 16 is coupled by assembly 17 to a U-shaped frame 140 of the vehicle. Similarly, a rear caster 18 is coupled by assembly 19 to the vehicle frame. A seat post 21 intersects shaft 14 as shown in FIG. 3A. The seat post 21 is in the vertical plane of casters 16 and 18 as shown in FIG. 2C. The center of gravity 20 of the body of the passenger on seat 11 is above the seat as shown in FIG. 3B. Dimensions of certain parts of vehicle 10 are shown in FIGS. 3A, 3B and 3C and provide a quick comparison with the dimensions of the corresponding parts of posts.

The scooter 8 of FIGS. 1A, 1B and 1C has drive wheels 22 on a common shaft 23 rearwardly of the seat post 24 and rearwardly of a steerable front wheel 25 on a shaft 26. The front wheel 25 is not powered but can be manually turned by a tiller. The center of gravity of the entire vehicle including the passenger is above the seat 27 in alignment with the seat post 24. The three wheels are spaced apart as shown in FIG. 1C.

A typical four-wheeled power base 9 shown in FIGS. 2A, 2B and 2C includes front wheels 28 rotatable on a common center line 29 and the front wheels are not powered. Seat post 30 is ahead of the rear wheels 32, the latter being powered and being on a common shaft 33.

Figure 6A:
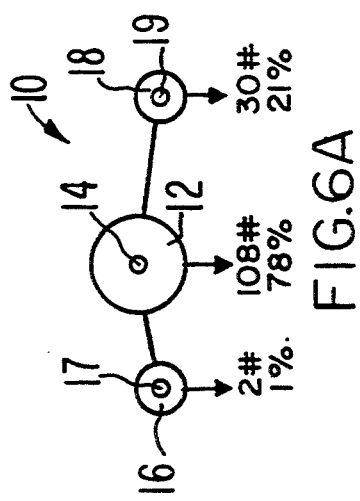
FIGS. 6A and 6B are views similar to FIGS. 5A and 5B but relate to the wheeled vehicle of the present invention.
Figure 4B:
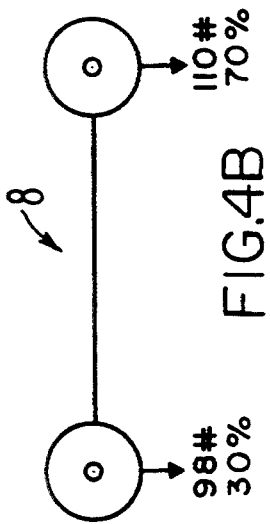
Figure 5B:
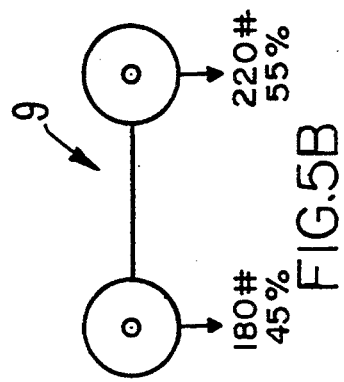
Figure 6B:
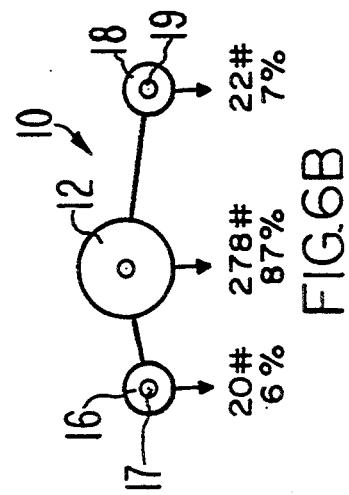

FIGS. 4A, 4B, 5A, 5B, 6A and 6B show the weight distributions to the wheels of the three- and four-wheeled vehicles, in an empty condition (FIGS. 4A, 5A and 6A) and with a 180 pound passenger on board (FIGS. 4B, 5B and 6B). It is to be noted that, at most, only 55–70% of the total weight is loaded on the driving wheels of the scooter and the four-wheel power base. As powered mobility devices have evolved, several problems inherent in these basic configurations have been noted.

The first problem arises because the passenger is carried well forward of the driving wheels of the scooter 8 and the four-wheel power base 9. A significant portion of the total vehicle weight is supported by the front wheels of these two vehicles. This has several deleterious effects. In the case of three-wheeled scooter 8, the unit is prone to tipping during moderate turns. In the case of the four-wheeled power base unit 9 the high weight loading, exceeding 50% under almost all circumstances, makes the swiveling action of the front casters extremely difficult, particularly on surfaces such as gravel or deep carpet, where an inordinate amount of power is needed to cause a turn. When steering of the front wheels finally occurs, the high power levels being delivered to the drive wheels causes an abrupt and, at worst, uncontrollable surge and swerve in the direction of the turn.

The second problem with scooter 8 and wheel base 9 of the prior art arises because of the same weight distribution problems. The four-wheeled power base or chair has significant difficulty following a straight track while driving along the side of a hill. The mass of the passenger between the front steering wheels and the rear driving/steering wheels produces a moment which causes the chair to turn down-slope unless immediate and significant uphill steering/power is applied.

The third problem associated with a three-wheeled scooter 8 and a four-wheeled power base 9 arises because power chairs have become more common. Public acceptance of the mobility impaired has become manifest. The expectations of the power chair have increased tremendously because of the high power and torque available from contemporary DC motors. Moreover, adhesion and traction problems have become significant. Small footprint tires and adverse weight distribution cause excessive tire slippage and spinning. This, in turn, produces limited traction under adverse weather or terrain conditions and, more critically, greatly diminished steering response.

The fourth problem arises in attempts to counteract any tendency to tip forwardly or backwardly during acceleration or deceleration of scooter 8 or vehicle 9. The wheel base seat must be relatively long with the seat placed somewhere between the front and rear wheels. This placement causes a constant comprise between anti-tip stability and realistic wheel loading. Furthermore, these compromises mandate the layout of vehicles 8 and 9 in a less than optimum manner.

Finally, the geometry, drive characteristics and overall packaging of the scooter 8 or power chair 9 produces large turning radii and clumsy handling in confined spaces. FIGS. 1A, 1B and 1C show a comparison of the geometry of the drive and steering wheels of the scooter 8, four wheel power base 9 and vehicle 10 of the present invention.

The present invention has drive wheels 12 which are powered by respective, individual DC motors 134 through gear boxes 136 on the bottom 138 of the U-shaped frame 140 of vehicle 10. Moreover, the drive wheels 12 are mounted directly under the center of mass of the vehicle 10 and the passenger on the vehicle. This arrangement significantly increases the amount of weight available for traction. FIGS. 6A and 6B show that approximately 78–87% of the weight of the vehicle load is on the drive wheels 12 of vehicle 10 when empty and when supporting a person on seat 11, respectively.

This exceeds 90% as the weight of the passenger goes up. The concentration of the mass directly in line with the center of the drive wheels 12 maximizes the resistance of the vehicle 10 to steering deviations caused by centrifugal force. Batteries 42 are carried on bottom 38 of frame 40 to provide electrical power for motors 34.

In FIG. 7, seat 11 is above frame 140 and between a pair of arms 144. One arm 144 carries a control box 146 having a joystick 148. An unsprung caster 150 is carried at the outer end of a rigid assembly 152 carried by and extending forwardly and downwardly from the upper part of frame 140 (FIG. 7). Vehicle 10 derives fore and aft stability from drive wheel assemblies placed approximately 14" in front of and 18" behind the central axis of driving wheels 12.

A rear wheel caster assembly 33 is pivotally mounted by a shaft 34 to the rear end 35 of a vertical pivot arm 36 (FIG. 12) pivotal about horizontal pin 37 attached to the frame 140 of vehicle 10. The movement of arm 36 is controlled by adjustable spring/shock absorber assembly 39. One end of assembly 39 is coupled by a pin 40 to arm 36. The opposite end 41 of assembly 39 is attached to the frame 38 of vehicle 10.

Front caster assembly 42 (FIG. 8) is attached to frame 140 in the same manner as that described above with respect to caster 33. In the alternative, the front caster assembly 42 may be attached to frame 140 of vehicle 10 with a rigid arm 43. Conversely, the rear caster assembly may be mounted with a rigid arm. In all cases, at least one of the supporting arms must be sprung. Depending upon the application, single or dual arm assemblies (FIGS. 20–25) or combinations of both may be used. Depending upon the operating terrain and the surface, either single or dual caster wheels may be used.

Figure 17:
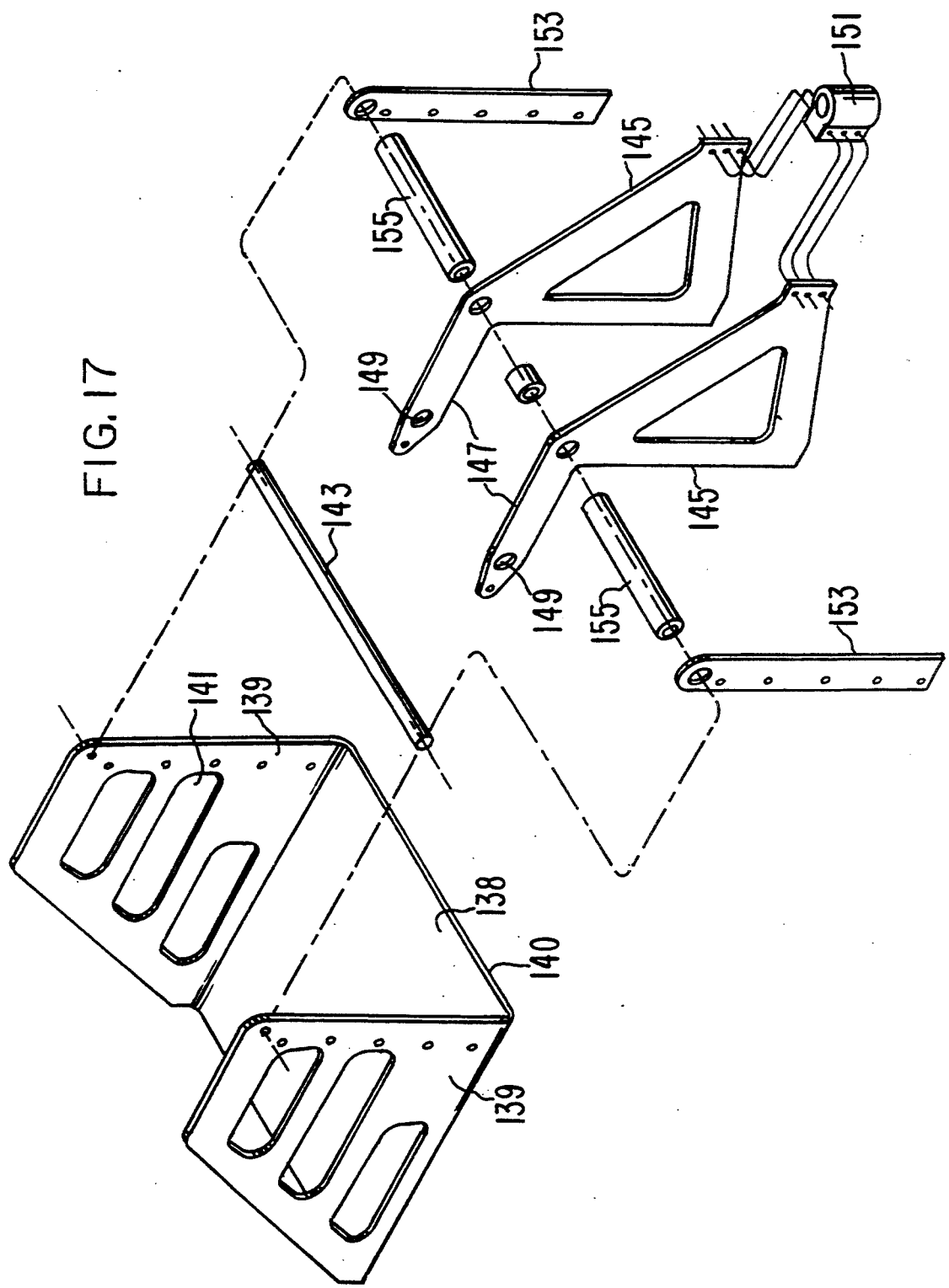
FIG. 17 is an exploded view of the frame and front caster mount of the vehicle of the present invention.

Frame 140 is shown in exploded detail in FIG. 17. The bottom 138 has a pair of spaced, generally parallel sides 139 with enlarged slots 141 formed therein to reduce the weight of the frame. A cross tube 143 extends across the open top of the frame and is coupled to the sides by suitable fasteners. A pair of triangular members 145 are secured by arms 147 to tube 143 in holes 149, whereby the pivot element 151 for the front caster 150 can be mounted. Upright straps 153 at the ends of a pair of relatively short tubes 155 are provided to stabilize the frame once it is mounted with the wheels 12 adjacent to the outer surfaces of sides 139.

FIG. 9 shows vehicle 10 with a part of frame 140 rearwardly of the drive wheels 12. The placement of gear boxes 136 and drive motors 134 is shown in FIG. 9. A sprung rear caster assembly 39 projects rearwardly from a body cross member 157.

A rigid assembly 152 having front caster 150 thereon projects forwardly from the central point of vehicle 10. The vehicle has no foot supporting treadles on opposite sides of assembly 152. Such treadles are eliminated or used depending upon the condition of the passenger on the vehicle.

FIG. 10 shows treadles 159 which extend forwardly from the frame 140 of the vehicle and are displaced on opposite sides of assembly 152 with caster 150 in the space 161 between the treadles 159.

In applications where a spring/shock assembly is used for the front or rear caster, an alignment block, rigidly affixed to the bottom of frame 38, extends through the side plates of the pivoting arm. This block provides sideways stability to the arm assembly during turns while allowing vertical movement of the swing arm assembly.

Due to the great stability of the unit, unique opportunities for adaptive seating can be addressed. For instance, a pediatric variant of the invention can be provided as shown in FIGS. 12–16. In this version, there are two fixed front support casters 44 and one rear spring/shock absorber assembly caster 45. Front casters 44 are mounted on the front ends of a pair of rigid arms 163 which project forwardly from the sides 139 of frame 140.

A powered seat of lift 46 is also provided on vehicle 10. The seat lift 46 may be attached to the seat 11 at either of two pivot points. The first is located under and generally in the center of the seat (FIGS. 13 and 14). Mounted in this way, the seat will be at a normal driving height when the lift 46 is in the elevated position. Actuating the lift 46 will allow the passenger to reach for items normally out of reach or to converse with other people a more natural level above the floor.

The seat 11 may also be attached to the lift mechanism at the upper rear edge of the seat assembly (FIGS. 17 and 18). In this configuration, the seat will be at normal driving height when the lift mechanism 46 is fully extended. Retracting the lift (FIG. 16) will lower the passenger to within 1–2" of the floor, allowing unassisted access to and from the chair. A further benefit of the symmetry of the design of vehicle 10 is its resistance to veering downhill when being driven along the side of a hill.

FIGS. 18–23 show other variations in the way in which the front caster of the vehicle is mounted. For instance, in FIG. 18, interchangeable frame components of different dimensions are illustrated. They include a pair of triangular members 170, 172 and links 174, 176 and 178 for mounting the front caster to the frame 140. FIG. 19 shows a single fixed front caster mount 180 on a pair of rods 182 secured to cross pieces 184 and 186 forming part of frame 140. FIG. 20 shows dual, fixed front casters. FIG. 21 shows a beam 182 rotatably mounted on a horizontal shaft 184 projecting forwardly from the frame of the vehicle 10. Casters 186 are pivotally mounted on the outer ends of beam 182 and this variation is to allow the vehicle to move over rough terrain where the beam 182 will pivot about the axis of shaft 184.

FIGS. 22 and 23 show sprung front casters, FIG. 22 showing a single caster and FIG. 23 showing a pair of casters.

In conventional power chairs, with the center of mass being placed ahead of the driving axle, a moment is produced which tends to pivot the chair about the inner drive wheel and turns it downhill. This phenomenon is particularly evident when encountering such obstacles as curb cuts and driveways. The swerves produced in some instances are uncontrollable and always alarming to the occupant.

Because the front and rear stabilizing casters are basically symmetrical and equally and lightly loaded, the chair 10 responds easily and identically to either forward or reverse driving commands. There is no caster break over as is commonly experienced with conventional power bases.

The placement of the driver directly between and on the center line of the drive wheels produces a true pivot under the operator's spine. This lessens the need for a person to develop special skills in operating vehicle 10. This feature also produces exceptional maneuverability and minimal turning radius. This style of turning is much more conducive to intuitive driving as there is an exact correlation between the movements of the body in relation to the movement of the chair itself. It lessens the congitive skills required for steering. For instance, the chair can be driven to the corner of a desk and then pivoted around the corner while maintaining precisely the same distance from the edge of the desk. Turns do not need to be lead. This also means that the unit can turn in place.

When equipped with a rigid support for the front caster, the unit is exceptionally resistant to tipping caused by stepping on the front foot rigging.

The unit maintains its stability even when tipped forward or backward on three wheels. This attribute can be used as an aid in climbing curbs. The chair is driven up to a location perpendicular to a curb. Using an actuator to move the seat 11 backward or forward, the center of gravity is shifted to lift the front wheels sufficiently to clear the curb. The chair is then driven forward allowing the drive wheels to contact the curb. The center of gravity is then shifted forwardly lowering the front wheel when the chair 10 is driven up the curb.

The entire frame 140 of the chair 10 is formed from a single piece of metal plate or molded from composite material. This simplicity of form and assembly is not only cost effective but produces a construction which is simple and rugged. It also makes the base highly adoptable to sophisticated power seat applications and non-standard user interfaces.

FIGS. 15 and 16 show a foot support 200 on the front end of seat 11. Foot support 200 includes a pair of L-shaped members pivotally mounted by pins 202 on the seat 11. A link 204 for each member, respectively, is pivotally mounted by a pin 206 on the corresponding L-shaped member. A pin 208 pivotally mounts the corresponding link 204 to a side wall 210 on the vehicle 10. When seat 11 is elevated, foot support 200 is generally vertical as shown in FIG. 15. When the seat is lowered, as shown in FIG. 16, foot support 200 is generally horizontal.

An alternate control is shown in FIGS. 24 and 25 and includes a speed control console 220 with a pair of handlebars 222 and a reverse lever 224 coupled to a forward lever 226, the levers being mounted by a shaft 228 and depending from console 220 as shown in FIG. 25. An electronic interface box is mounted to the extension of the chair arm 44 and the handlebar 222 is rotatably mounted by a shaft 230 on interface box 232.

I claim:

1. A powered mobility vehicle comprising:
a frame having a pair of spaced sides;
a pair of ground-engaging wheels coupled with respective sides of the frame and being rotatable about a common axis;
chair means on the frame for supporting a passenger on the frame, the center of the mass of the passenger being substantially in a first vertical plane in which the axis of the wheels are located when the passenger is supported on said frame;
a front caster and a rear caster;
an elongated member for each caster, respectively;
means for pivotally mounting one of the members on the frame for movement in a second vertical plane substantially normal to the first vertical plane, said casters being coupled with the frame to stabilize the same when the wheels move over the ground, said caster having pivot means in a vertical plane between the sides of the frame, the other member being in the second plane;
means biasing said one member in a direction to keep the respective caster in engagement with the ground; and
motor means coupled with the drive wheels for steerably and drivingly rotating the drive wheels independently of each other relative to the frame to move the frame directionally over the ground.

2. A vehicle as set forth in claim 1, wherein said frame has a bottom, said motor means being mounted on the bottom between the sides thereof.

3. A vehicle as set forth in claim 1, wherein the common axis is generally horizontal.

4. A vehicle as set forth in claim 1, wherein the chair means includes a seat, said center of mass being above the seat.

5. A vehicle as set forth in claim 1, wherein the chair means has a seat post, said center of mass being above the seat post and in vertical alignment therewith.

6. A vehicle as set forth in claim 1, wherein said motor means includes a motor for each drive wheel, respectively, an electrical power source for each motor, respectively, and control means for controlling the operation of the motors.

7. A vehicle as set forth in claim 6, wherein the motors are operated independently of each other.

8. A vehicle as set forth in claims 1, wherein said means biasing said one member includes a shock absorber assembly for providing a spring bias to allow the corresponding caster to be biased downwardly and movable upwardly in a generally vertical plane.

9. A vehicle as set forth in claim 8, wherein the vertical plane in which the caster moves is generally parallel plane with the direction of movement of the vehicle.

10. A vehicle as set forth in claim 9, wherein the shock absorber assembly is coupled with the rear caster.

11. A vehicle as set forth in claim 1, wherein said front caster is closer to the vertical plane of the drive wheels than the rear caster.

12. A vehicle as set forth in claim 1, wherein the front and-rear casters are in a vertical plane midway between the drive wheels.

13. A vehicle as set forth in claim 1, wherein the first caster includes a pair of legs near the lower portion of the sides of the frame, said legs extending forwardly from the frame at the bottom thereof, and a caster element for each projection, respectively.

14. A vehicle as set forth in claim 1, wherein is included chair means mounting the seat on the frame for up and down movement with respect thereto.

15. A vehicle as set forth in claim 14, wherein the means for mounting the seat includes a pair of relatively telescoping members carried by the frame, the lower end of one member being supported on the upper surface of the bottom of the frame.

16. A vehicle as set forth in claim 15, wherein said chair means includes a seat post forming a part of the elevator means, the upper end of the seat post being coupled to the seat of the chair.

17. A vehicle as set forth in claim 15, wherein the mounting means includes a piston and cylinder system coupled to the seat of the chair means.

18. A vehicle as set forth in claim 17, wherein the piston of the system is coupled to the upper end of the seat.

19. A vehicle as set forth in claim 1, wherein is included a horizontal shaft extending forwardly from the frame and a beam rotatably mounted on the shaft, there being a caster for the outer ends of the beam.

20. A vehicle as set forth in claim 19, wherein is included a foot support on the seat, said foot support being generally vertical when the seat is elevated, said foot support being generally horizontal when the seat is at its lowest position.

* * * * *